Feb. 26, 1957  H. LEBESON  2,783,153
METHOD FOR PROCESSING FRUITS AND THE LIKE
Filed May 26, 1953
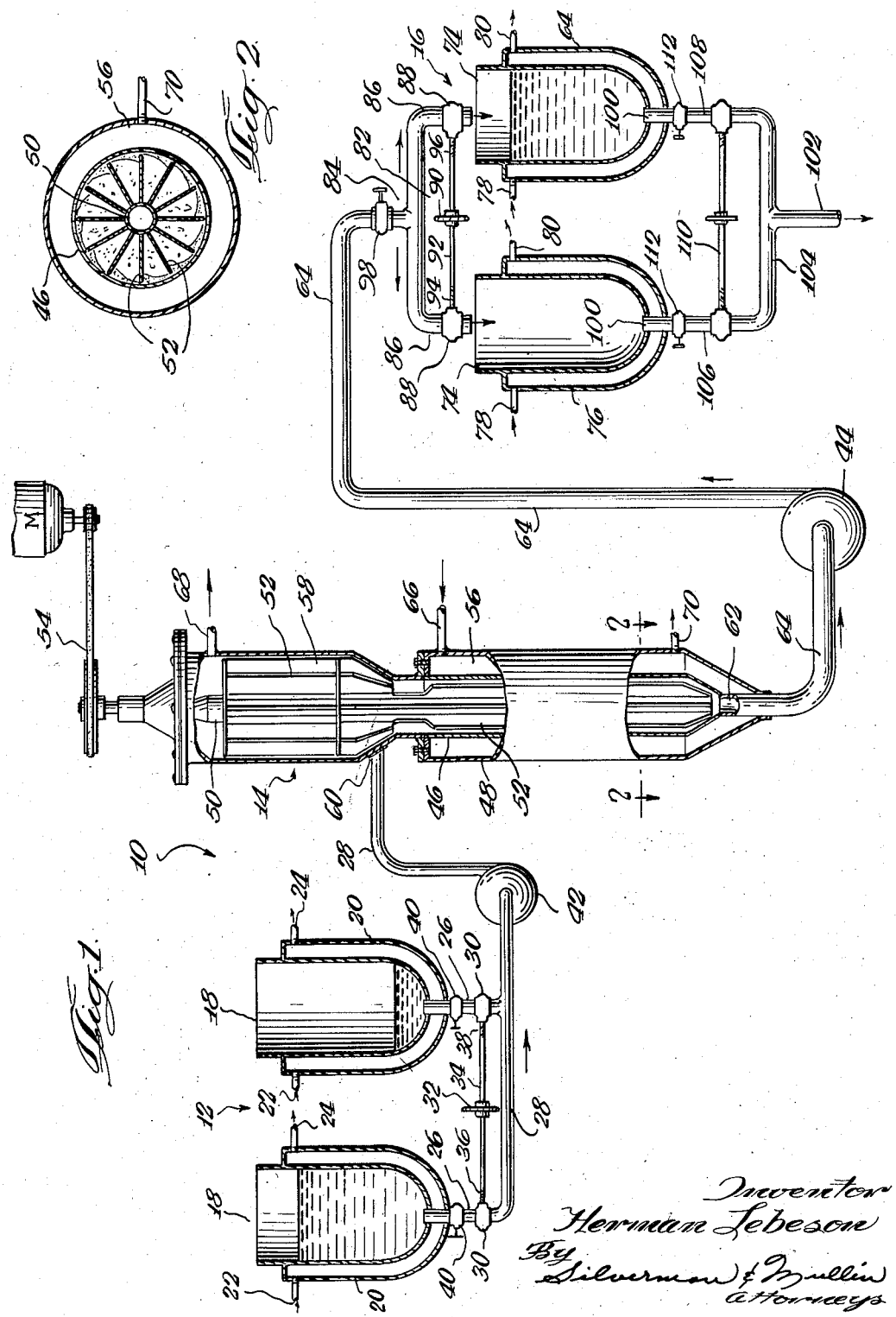

United States Patent Office 2,783,153
Patented Feb. 26, 1957

2,783,153

METHOD FOR PROCESSING FRUITS AND THE LIKE

Herman Lebeson, Winnetka, Ill.

Application May 26, 1953, Serial No. 357,482

8 Claims. (Cl. 99—129)

This invention relates to a new and improved method and apparatus for processing fruits and similar food commodities. More particularly the invention relates to a unique continuous process for the production of jams, jellies, purees, butters, liquid jelly juices and the like and to an apparatus for practicing such a process.

Heretofore food products of the type specified hereinabove have been processed almost exclusively by the batch method. Inherently such methods are inferior to continuous processes especially where large quantities of fruits and vegetables are processed. Aside from the substantially higher cost resulting from excessive labor, longer time required and similar factors the substantially greater role played by the human element in such processes presented a number of undesirable problems. Thus uniformly high quality of finished products is difficult if not impossible to achieve. Hence, the need for a practical and effective continuous process in the manufacture of the aforementioned food products has been great and long felt.

It is therefore an important object of this invention to provide a continuous process and apparatus for practicing such process which will overcome all of the objections mentioned hereinabove.

In a continuous process for making jams, jellies and the like, it is necessary to maintain a much greater degree of control than was heretofore found necessary in the batch process. Such control is essential to insure that the product jells properly and at the proper time. For example, jellies and jams containing a high percentage of solids are apt to jell within the apparatus before the process is completed so that continuous flow of the material would thereby be prevented. Hence, it is important that in the continuous process, through control of temperatures and rate of flow, apparatus design, selection of proper additions and timing of the additions, overall control be maintained so that the product will positively jell but only after the same has been packaged in the ultimate containers such as glasses, jars, etc.

It is therefore another important object of this invention to provide a continuous process and apparatus for making jellies, jams and the like in which positive and sensitive control of the jellying action may be maintained throughout the entire process.

Another object is to afford a method and apparatus in which although heat is employed to produce jellies, jams and the like, the heat transfer is of maximum efficiency resulting in a substantial overall conservation of heat.

A further object is to provide a method and apparatus of the character described capable of achieving substantially greater uniformity of the finished product than heretofore obtainable in the batch process.

Still another object is to afford a process of a continuous nature in which the fruits are processed in a minimum of time with little or no lost time intervals, once the process is commenced.

Still a further object is to provide a process capable of being conducted by a minimum number of operators so that the saving in time per unit of finished product is, to say the least, substantial.

Yet another object is to afford a process and apparatus in which volatile aromas, flavors and colors of fruits and juices and preserved to a remarkable extent.

Yet a further object is to provide a method in which the materials are exposed to heat for a substantially shorter period of time.

Another object is to afford a method and apparatus in which the boiling point of the materials being processed is maintained as low as possible.

A further object is to provide a process and apparatus in which undesirable side effects such as frothing heretofore experienced in the usual processes are reduced to a minimum if not completely eliminated.

And yet another object is to afford a method and apparatus for processing fruits and similar raw materials which is simple and easy to practice, yet effective and inexpensive.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a diagrammatic sketch illustrating the apparatus for practicing the process as well as a flow sheet for the process itself; and Fig. 2 is a sectional view taken on the plane of 2—2 in Fig. 1 of the drawings and illustrating the action which takes place in the evaporating phase of the process.

The unique apparatus provided for practicing the process is shown in Fig. 1 of the drawings. Reference numeral 10 indicates generally the apparatus which is roughly divided into three separate sections or phases. The first section, indicated generally by reference numeral 12, is the pre-cooking apparatus. The second section, indicated generally by reference numeral 14, is the concentrating or evaporating mechanism, and the finishing apparatus is indicated generally by reference numeral 16.

Turning now to a more detailed consideration of the various components comprising the apparatus. The pre-cooking portion of the apparatus comprises a pair of heated kettles such as 18 which may be heated by any conventional method but as illustrated in the embodiment selected for presentation here is heated by steam. Hence, the kettles 18 are surrounded by steam jackets such as 20 having steam inlet lines such as 22 and steam exhaust lines such as 24.

Each of the kettles 18 is connected by means of connecting pipes such as 26 to a main pipe line 28. The pipes 26 are positioned in the bottom of the kettles 18 so that the contents of the kettles may be drained by gravity into the pipe lines 28.

Control mechanisms are provided for regulating and controlling the flow of the contents of the kettles 18 as desired. Specifically such control mechanisms may comprise a pair of gate valves as indicated by reference numeral 30 positioned and adapted to simultaneously open one connecting pipe 26 and close the other connecting pipe 26. These gate valves may be operated either automatically or by hand. As illustrated in the drawings a hand-operated mechanism is shown comprising a hand wheel 32 mounted on a shaft 34 with one end of the shaft provided with left-hand threads 36 and the other end provided with right-hand threads 38. Thus when the hand wheel 32 is rotated in one direction one of the valves 30 is closed and the other open. When the wheel 32 is rotated in the opposite direction the other valve is closed and the other simultaneously opened. Hence continuous flow from the pre-cooking apparatus is assured.

In addition to the gate valves 30 individual hand operated safety valves such as 40 may be provided for each kettle 18. Thus individual control of each kettle may be practiced as desired.

The entire apparatus may be set up in such a manner that the material being processed may be transferred by means of gravity flow or by any other desirable means such as vacuum or pump. In the embodiment chosen for illustration pumps such as 42 and 44 may be utilized for drawing or pumping the material to the various parts of the apparatus.

The concentrating phase of the process may be practiced in a continuous vacuum evaporator 14 comprising an elongated vertically disposed tube 46 surrounded by a heating jacket 48. This jacket, however, is limited to the lower part of the tube 46 for reasons which will become apparent as the description proceeds.

Extending throughout the central portion of the tube 46 is a rotor 50 having outwardly extending blades such as 52, said blades extending to within a very short distance of the inner wall of the tube 46.

The rotor 50 may be operated by means of a motor M connected to the rotor by means of a pulley and belt mechanism indicated generally as 54. Hence it should be obvious that rotation of the rotor 50 likewise revolves the blades 52 within the tube 46.

It will be noted that the concentrator or evaporator 14 is divided into a lower section which comprises the concentrating chamber 56 and an upper unheated chamber 58 adapted to "knock out" any droplets entrained in the escaping vapors.

The material from the pipe line 28 is introduced into the evaporator 14 through an inlet 60. The concentrated product flows by gravity out of the bottom of the concentrator through an outlet 62 into a pipe line 64. The pipe 46 is heated by means of steam introduced into the heating jacket 56 by means of an inlet steam line 66. The vapors may be exhausted through a vapor outlet 68, and steam outlets such as 70 may be provided in a plurality of positions in the steam jacket 56.

The finishing apparatus may comprise a pair of finishing kettles such as 74 which may resemble the pre-cooking kettles 18 but may be of somewhat smaller size. Thus again the kettles may be heated by means of steam jackets such as 76 with steam inlets such as 78 and steam outlets such as 80. A gate valve system indicated generally by reference numeral 82 similar to that described in connection with the pre-cooking apparatus may be provided for controlling and regulating the flow of the concentrates from the pipe line 64 into the precooking kettle 74. Thus the pipe line 64 is provided with an inverted Y-pipe 84 providing an inlet pipe 86 for one of the kettles 74 and another inlet pipe 88 for the other. Near the outer ends of these inlet pipes 86 and 88 are provided a pair of gate valves such as 88 again controlled by a hand wheel 90 mounted on a shaft 92 having right-hand threads 94 at one end and left-hand threads 96 at the other. Thus the flow of material through the Y-pipe 84 may be so controlled so that all of the material may be permitted to flow into one or the other of the kettles 74 as desired.

Again a manually operated safety valve such as 98 may be provided in the pipe line 64 as illustrated in the drawings.

The kettle 74 may likewise be drained by gravity through pipe outlets such as 100 provided in the bottom of the finishing kettles 74. The outlets 100 are connected to a main pipe line 102 by means of a Y-pipe 104 with a branch pipe line 106 connecting one of the kettles 84 and another branch pipe line 108 connecting the other kettle 84. Again a gate-valve assembly may be provided for controlling the flow of the finished product from the finishing kettles 84. So also manually operated safety control valves such as 112 are provided for controlling individually each of the finishing kettles 74. The main pipe line 102 may then be connected to a filling machine and bottling mechanism of any conventional type, and hence is not illustrated in the drawings.

Turning now to a more detailed description of the process, the fruits or fruit juices and the like may be poured directly into one or the other of the pre-cooking kettles 18 until the same is filled. Granulated sugar or sugar syrup may then be added to the material and finally pectin solution is added along with a small amount of sodium citrate as desired. The sodium citrate prevents jellying of the material in the kettle. These materials are then cooked in the kettle with the temperature being slowly raised until approximately 190 degrees Fahrenheit has been reached.

The gate valve 30 may then be opened permitting the contents of the first kettle 18 to be drained into the pipe line 28. During the time that the first kettle is being drained the second kettle 18 may be charged in the same manner as the first kettle and the contents processed similarly. The kettles are ordinarily selected and constructed in such a manner and of such a size that the processing of the contents of one kettle may be accomplished during the draining of the other so that upon completion of the drainage of one kettle the contents of the other kettle is ready to be drained. Hence uninterrupted continuous flow into the pipe line 28 is assured.

The pre-cooked material is then pumped by means of the pump 42 through the pipe line 28 into the concentrater 14. The material enters the concentrater through the inlet 60 and is immediately picked up by the rotating blades 52 which throw it as a thin film against the wall of the pipe 46. This film then gravitates in a continuous curvilinear flow downwardly along the wall of the heated pipe 46 so that concentration is quickly and evenly effected as the liquid passes through the heated zone.

The products of evaporation rise into the upper unheated zone 58 where any droplets entrained in the vapors are condensed and flow back into the evaporating zone 56.

The action of the blades not only maintains a thin film but also helps to keep it in a continual turbulent motion thereby preventing localized overheating. Since only a comparatively small amount of material is contained in the tube at any one time and since the evaporation is carried out under vacuum with a consequent lower boiling point, the concentration is accomplished quickly and with minimum adverse effects to the material by reason of the elevated temperatures. Thus, volatile aromas, flavors, and colors are conserved to a remarkable extent adding greatly to the quality of the product.

The rate of flow and the temperature within the evaporator may be so regulated that the concentrated material leaving the evaporator 14 has a total solids of not less than 65° Brix and a temperature of approximately 190–200 degrees F.

The concentrated product of the evaporator is then pumped into one or the other of the finishing kettles 74 until the same is filled to the extent desired. The gate valve 82 is then operated shutting off the flow into the one kettle and opening the flow into the other. While the second kettle is being filled, citric acid solution is added to the first finishing kettle 74 in an amount sufficient to bring the pH down to about 3.4 to 3.0. The acid solution is mixed thoroughly with the concentrate and the gate valve 110 then operated to permit the contents of the first finishing kettle to be drained into the pipe line 102. The finished product is conducted through the pipe line 102 and thence into a filling machine and bottling apparatus where the jellies, jams and the like are measured into proper containers thereby finishing the process.

It should be noted that the sodium citrate and pectin additions in the pre-cooking kettles, the rate of flow through the entire apparatus, the heating temperatures, the rate of evaporation, the rate of cooling within the apparatus and the control of the hydrogen-ion concentration by the addition of the citric acid solution in the finishing kettles, all are elements in establishing control of the jellying process to such an exact and sensitive degree that the product does not actually jell until it is in the jars or glasses. At this point however, as the temperature drops within the glass, the product jells to the optimum degree.

As a specific example of the practicing of the process the manufacture of grape jelly will now be described in detail. One of the pre-cooking kettles 18 is charged with 58 gallons of grape juice containing about 14.1° Brix solids. To this is added 600 lbs. of granulated sugar or its equivalent in 66° Brix sugar syrup of 900 lbs. To this is added 93 lbs. of 10% 150 grade pectin solution and 6 ozs. of sodium citrate crystals. This mixture is heated to about 190° F. The valve is then opened permitting the contents to flow through the pipe line 28, and pumped by means of the pump 42 into the evaporator 14. In the meantime while the contents of the first kettle 18 is being emptied the second kettle is charged and heated in the same manner as the first.

Through the inlet 60 the material enters the evaporator 14 where it is concentrated in the manner previously described so that the solids content is approximately 65 to 66%. As it leaves the concentrater through the outlet 62 the temperature of the material is approximately 190–200 degrees F.

By means of the pump 44 the concentrated solution is pumped into one or the other of the finishing kettles 74 where about 95 ounces of a 50% solution of citric acid is added and thoroughly mixed into the solution. The temperature within the kettle is maintained at approximately 190° F. As soon as it is thoroughly mixed the outlet gate valve 110 is operated so that the contents of the kettle is drained through the pipe 106, Y-pipe 104 and into the pipe line 102 through which it is conducted into the filling machine.

For the manufacture of grape jam the same procedure is followed with the exception that the raw material may be grape pulp rather than grape juice and the finished product is concentrated to 68% solids.

The same process and apparatus may be used for making liquid jelly juices. In such a process the citric acid is not added at the end of the process but instead a mild alkaline solution is added to bring the jelly juices up to a pH of 5.5 in order to prevent jelly formation. Moreover a somewhat larger proportion of sodium citrate may be added at the beginning of the process. The finished product of such a process, namely liquid juices, may be packed in suitable containers for use later in the making of jellies. When it is desired to utilize the jelly juices for this purpose, the pH may be lowered by the addition of citric acid solution until a pH of 3 to 3.4 is attained. This will result in the production of a good, firm jelly.

By a slight modification of the concentrating equipment, whole fruit preserves could likewise be processed.

In such a modification of the evaporator, the gap between the outer edges of the blades 52 and the inner wall of the tube 46 would have to be slightly increased.

In the actual practice of the process in a processing plant a number of different varieties of fruits could be processed continuously one after the other with little or no interruption between "runs." In such case the production could be planned so that processing would progress from the lightest color to the darkest color to insure against discoloration at the beginning or end of each variety run.

Where the process is primarily limited to long runs of one variety the apparatus may be modified by substituting one large deep pre-cooking kettle for the kettles 18 and one large finishing kettle for the finishing kettles 74. When so modified the additions may be metered into the tops of the kettles so that mixing is accomplished as the materials settle to the bottom of the kettles. Thus by the time the material has reached the bottom, complete mixing has taken place so that the flow into, through and out of the apparatus is continuous and completely automatic.

From the above description it should be apparent that I have provided an apparatus, and a process which may be practiced by means of the apparatus, for continuously producing a variety of food products processed from either fresh fruits and vegetables or from partially processed fruits and vegtables.

It is believed that my invention in all of its phases has been clearly set forth herein such that the practicing of the method and construction of the device should be readily understood without further description, and it should be manifest that the details of the method and of the construction of the apparatus described are capable of wide variation within the purview of the invention as described in the appended claims.

What I claim and desire to secure by Letters Patent of the United States is:

1. The continuous process for producing jellies which include, in the order stated, the steps of pre-cooking a mixture consisting of substantially 45% fruit juice and 55% sugar solids with pectin solution and a relatively small amount of sodium citrate at a temperature of 190° to 215° Fahrenheit, concentrating by evaporation under vacuum said pre-cooked mixture during uninterrupted flow thereof to a total solids of 65% to 68% and a temperature of 175° to 200° Fahrenheit, and the finishing of the concentrate by the adjustment of the acidity thereof to a pH of 3.0 to 3.4 through the addition of citric acid, said process characterized by the control of the jellying action so that the same takes place only after the concentrate has been packaged in suitable containers.

2. The method of producing fruit jelly in a continuous process which consists of heating a mixture of 58 gallons of approximately 14.1° Brix fruit juice with 600 pounds of granulated sugar and 93 pounds of 10% 150 grade pectin solution and 6 ounces of sodium citrate crystals to a temperature of approximately 190° Fahrenheit, concentrating said mixture under vacuum during continuous flow thereof to a total solids of 65% to 66% and a temperature of 190° to 200° Fahrenheit, finishing the concentrate by thoroughly mixing 95 ounces of a 50% solution of citric acid therewith while maintaining the temperature at approximately 195° Fahrenheit, said process characterized by the control of the jellying action so that the same takes place only after the concentrate has been packaged in suitable containers.

3. The continuous process for producing jellies which include, in the order stated, the steps of pre-cooking a mixture consisting of substantially 45% fruit juice and 55% sugar solids with pectin solution and a relatively small amount of sodium citrate at a temperature of 190° to 215° Fahrenheit, concentrating by evaporation under vacuum said pre-cooked mixture during uninterrupted flow thereof to a total solids of 65% to 68% and a temperature of 175° to 200° Fahrenheit, the finishing of the concentrate by the adjustment of the acidity thereof to a pH of 3.0 to 3.4 through the addition of citric acid, the packaging of the concentrate in individual containers at temperatures of 175° to 200° Fahrenheit and the cooling of the packaged concentrate through the coagulation temperature zone so that jellying during the entire process is confined solely to that which takes place within the containers.

4. The continuous method of producing jams, jellies, purees, butters and liquid jelly juices which consists of pre-cooking a mixture of fruit and fruit juices together with sugar solids and pectin, at approximately 190° Fahrenheit, maintaining continuous flow of said mixture, concentrating said mixture by heating a continuously flowing thin film of said mixture so that the product of evaporation is substantially higher in percentage of solids than the pre-cooked mixture and the temperature of said product is 175° to 200° Fahrenheit, finishing said product by adjusting the same to the desired pH value, maintaining in a continuous flow of said finished product, said process characterized by control of the jellying action so that the same takes place only after the finished product has been packaged in suitable final containers.

5. The continuous method of producing liquid jelly juices which consists of heating a mixture comprising approximately 45% fruit juice, 55% sugar solids, pectin and sodium citrate to approximately 190° Fahrenheit, maintaining a continuous flow of said mixture, condensing said mixture under vacuum by heating a continuously flowing thin film of mixture so that the evaporation product is susbtantially higher in percentage of solids than the pre-cooked mixture and the temperature of said product is 175° to 200° Fahrenheit, finishing said product by adding a mild alkaline solution to bring the acidity of the product up to a pH of about 5.5, and maintaining a continuous flow of finished liquid jelly juices.

6. In a method for producing jellied food products which consists of pre-cooking the food product at approximately 190° F., maintaining a continuous flow of said product, concentrating the food product by heating to a temperature of 175° to 200° F. while the same is continuously flowing, finishing the concentrate by adjusting the acidity of the concentrate to the desired pH value to preserve the same in the desired physical state; the steps of adding sugar solids, pectin solution, and sodium citrate during said pre-cooking operation, adding citric acid during the finishing step, and controlling the temperatures during the entire process, controlling the rate of evaporation and the rate of flow during the process, whereby said process is characterized by control of the jellying action so that the same takes place only after the concentrate has been poured into suitable individual containers.

7. The continuous method of producing jams, jellies, purees, butters and liquid jelly juices which consists of pre-cooking a mixture of fruit and fruit juices together with sugar solids and pectin at a temperature of 190° to 215° Fahrenheit, concentrating said mixture by evaporation during uninterrupted flow thereof to a total solids of 65% to 68% and a temperature of 175° to 200° Fahrenheit, and finishing the concentrate by adjusting the acidity of the same to the desired pH value while simultaneously maintaining the temperature of said concentrate at 175° to 200° Fahrenheit, said process characterized by the control of the jellying action so that the same takes place only after the concentrate has been packaged in suitable containers.

8. The method of claim 4 in which the ratio of fruit juice to sugar solids is substantially 4.5 to 5.5 and in which the acidity of the product is adjusted by adding citric acid.

References Cited in the file of this patent

UNITED STATES PATENTS

| 1,049,794 | Young | Jan. 7, 1913 |
| 2,139,478 | Williams | Dec. 6, 1938 |
| 2,163,132 | Roney | June 20, 1939 |
| 2,353,784 | Reich | July 18, 1944 |
| 2,542,269 | Zahm | Feb. 20, 1951 |
| 2,546,380 | Zahm | Mar. 27, 1951 |

OTHER REFERENCES

"Commercial Fruit and Vegetable Products" by Cruess, third edition, McGraw-Hill Book Company, Inc., New York, 1948, pages 377, 402 and 409.